United States Patent [19]
Litchfield et al.

[11] 3,911,590
[45] Oct. 14, 1975

[54] RECORDING INCLINOMETER-1

[75] Inventors: Mason R. Litchfield; Floyd L. Scott, Jr., both of Houston, Tex.

[73] Assignee: Thermotics, Inc., Houston, Tex.

[22] Filed: Sept. 10, 1973

[21] Appl. No.: 395,701

Related U.S. Application Data

[63] Continuation of Ser. No. 123,961, March 15, 1971, abandoned.

[52] U.S. Cl. ......................... 33/306; 33/308; 33/311
[51] Int. Cl. ................................................ G01c 9/14
[58] Field of Search ............. 33/304, 306, 307, 308, 33/309, 310, 311

[56] References Cited
UNITED STATES PATENTS

| | | | |
|---|---|---|---|
| 1,907,167 | 5/1933 | Williams | 33/311 |
| 2,608,002 | 8/1952 | Bielstein | 33/311 |
| 2,770,887 | 11/1956 | Barnett et al. | 33/310 |

*Primary Examiner*—Richard E. Aegerter
*Assistant Examiner*—Steven L. Stephan
*Attorney, Agent, or Firm*—Ned L. Conley; Murray Robinson; David Alan Rose

[57] ABSTRACT

A well bore inclinometer mounted in a sub forming part of a drill string includes a record tape cartridge that is reciprocated each time pump pressure is shut off and restored. Each upward motion causes tape to be perforated by a punch on the lower end of a pendulum. The position of the punched hole relative to field of the tape indicates degree and direction of inclination. Each reciprocation of cartridge moves tape to present new field. The pendulum may be magnetized to function as a compass and the punch mark used in the form of a pointer to indicate a compass direction relative to the pendulum.

12 Claims, 14 Drawing Figures

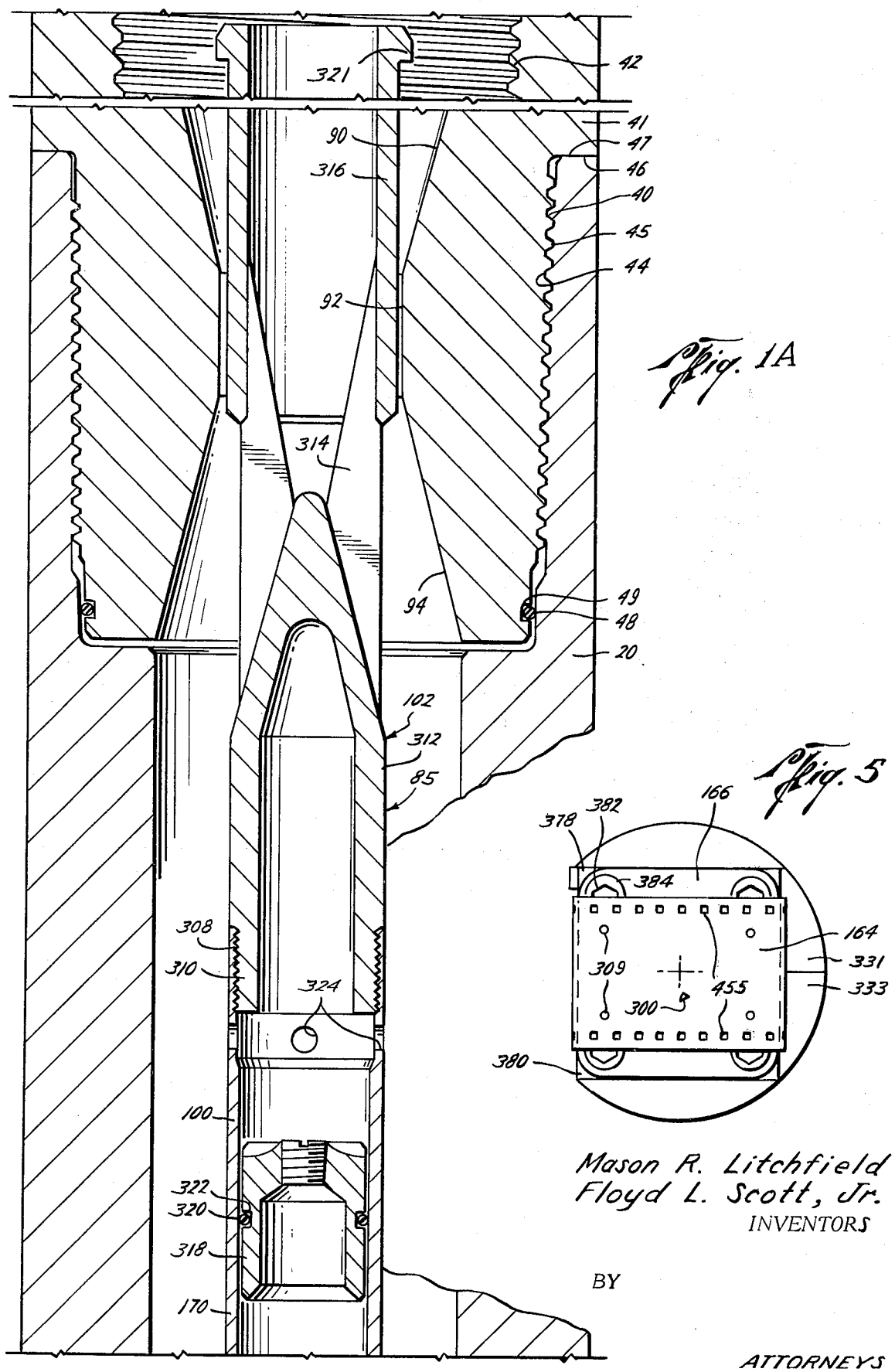

Mason R. Litchfield
Floyd L. Scott, Jr.
INVENTORS

BY

ATTORNEY

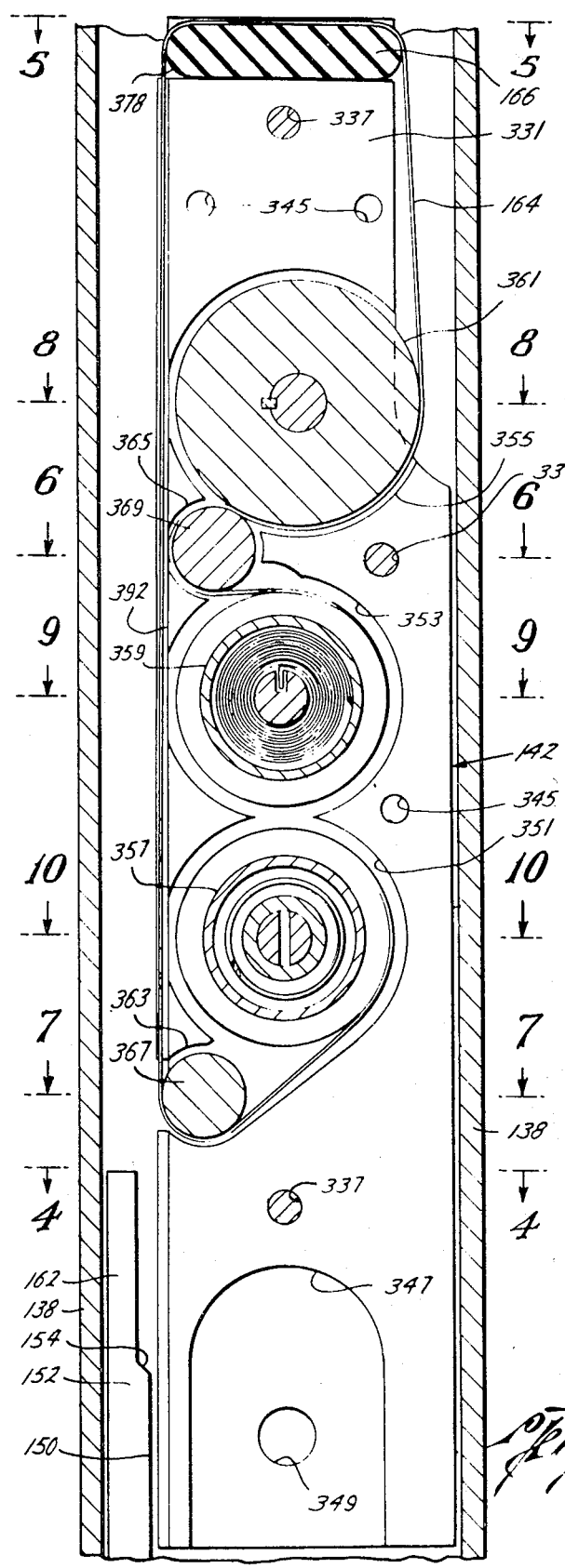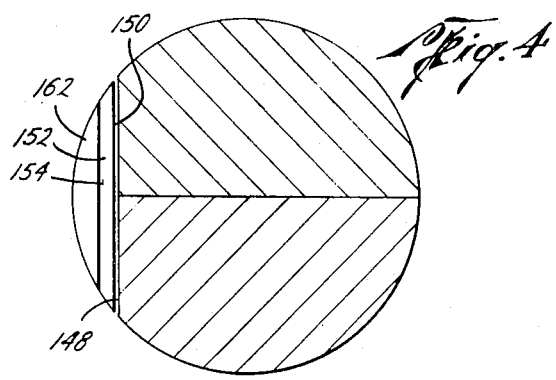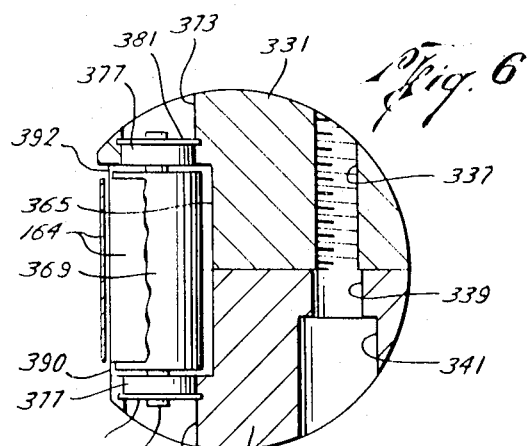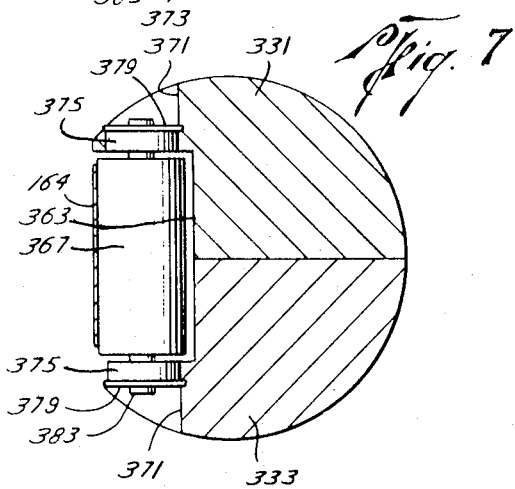
Mason R. Litchfield
Floyd L. Scott, Jr.
INVENTORS
BY
ATTORNEY

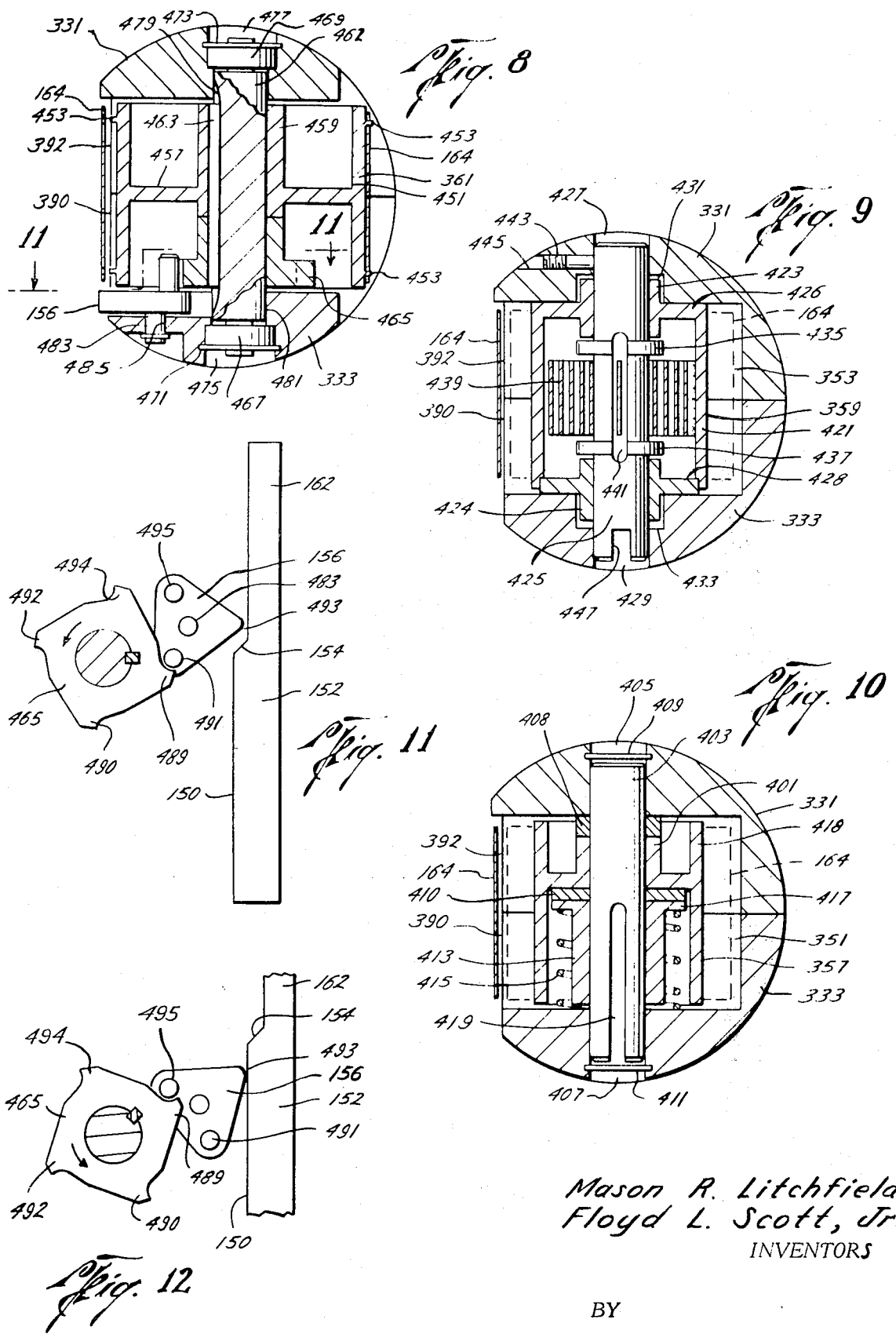

RECORDING INCLINOMETER-1

This is a continuation of application Ser. No. 123,961, filed Mar. 15, 1971, now abandoned.

BACKGROUND OF THE INVENTION:

a. Field of Invention

This invention relates to well drilling and more particularly to the determination of the angle and direction of inclination of the well bore. The present invention provides wire line retrievable means and method to determine and record the extent and direction of deviation every time the pumps are shut down, e.g. whenever adding a length of pipe to the drill string or whenever it is desired to make such a determination.

b. Discussion of the Prior Art

In drilling wells it usually occurs that the well bore deviates from vertical to a greater or lesser extent. In order to determine the extent and direction of deviation a variety of surveying instruments have been devised, many of which include a pendulum to provide a vertical reference and some magnetic device for determining direction. Various means of recording the inclination and direction of the well bore as determined by the surveying instrument have been devised. Fluid pressure has been used in prior devices to actuate a device mounted within the drill string, e.g. as disclosed in U.S. Pat. Nos. 2,953,350; 3,105,561; and 3,460,639. Other patented devices have provided means for retrieving a device located within the drill string, e.g. as disclosed in U.S. Pat. Nos. 2,207,505 and 2,600,125.

SUMMARY OF THE INVENTION:

According to the invention a well bore inclinometer is mounted in a sub forming part of a drill string. The inclinometer includes a record tape cartridge that is reciprocated each time the pump pressure is shut off and restored. Each upward motion causes the tape to be punctured by a punch on the lower end of a pendulum. The position of the punched hole relative to the field of the tape indicates the degree and direction of inclination of the well bore. Each reciprocation of the cartridge moves the tape to present a new field. The pendulum may be magnetized to function as a compass and the punch mark may be in the form of a pointer, e.g. V-shaped, to indicate compass direction.

BRIEF DESCRIPTION OF THE DRAWINGS:

FIGS. 1A, 1B, 1C, together form a vertical section through an inclinometer embodying the invention; the group being sometimes hereinafter referred to as FIG. 1;

FIG. 3 is an elevation showing the interior of one side of the tape cartridge case;

FIG. 4 is a section through the inclinometer at the plane indicated in FIG. 3;

FIG. 5 is an end view of the tape cartridge case and FIGS. 6–10 are sections through the tape cartridge at the planes indicated in FIG. 3;

FIG. 11 is a fragmentary section taken at plane 11—11 of FIG. 8; and

FIG. 12 is a view similar to FIG. 11 but showing the parts in a different position.

DESCRIPTION OF THE PREFERRED EMBODIMENT:

DRILL STRING ELEMENT

Figure 1B:
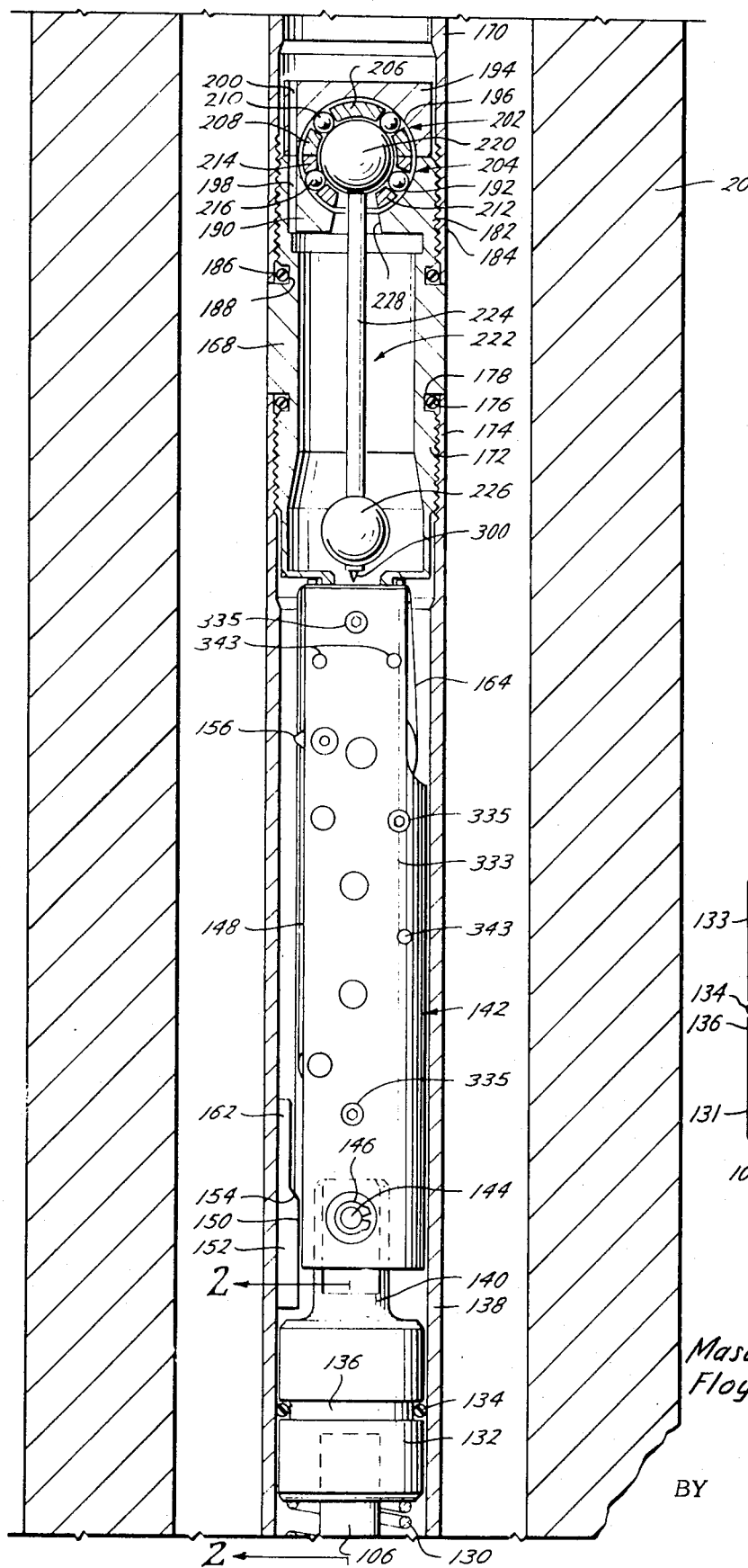
Figure 1C:
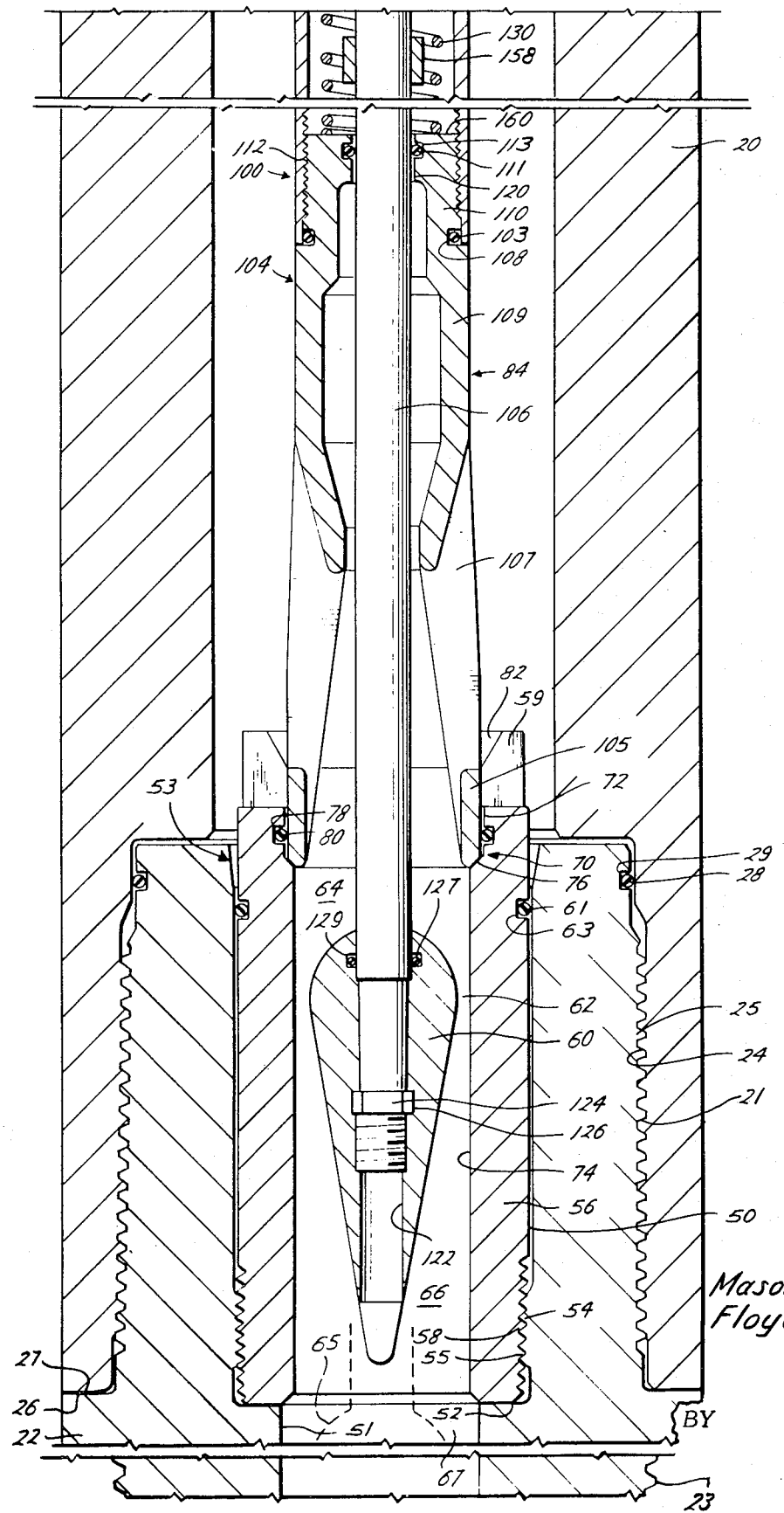

Referring now to FIG. 1 there is shown a well bore inclinometer including a short length of pipe 20 having inner and outer diameters of drill collar dimensions. The lower end of pipe 20 is connected at 21 to tubular sub 22 having a tapered threaded pin 23. Pin 23 provides threaded means for making a rotary shouldered connection with the box of another portion of a drill string, e.g. a drill bit (not shown) to be connected below the inclinometer.

Connection 21 includes threaded box 24, threaded pin 25, engaged shoulders 26, 27, and an O-ring seal 28 disposed in annular groove 29 at the end of pin 25.

The upper end of pipe 20 is connected at 40 to tubular sub 41 provided with a tapered threaded box 42. Box 42 provides means for making a rotary shouldered connection with a pin on the lower end of another portion of a drill string, e.g. a drill collar (not shown) to be connected above the indinometer.

Connection 40 includes threaded box 44, threaded pin 45, engaged shoulders 46, 47 and an O-ring seal 48 disposed in annular groove 49 at the end of pin 45.

The pipe 20, sub 22, and sub 41 are adapted to form an element of a rotary drill string and provide means to transmit fluid and forces (axial, torsional, bending and all other mechanical forces) between adjacent portions of a drill string connected thereabove and therebelow.

FLUID PRESSURE RESPONSIVE ACTUATING MEANS

Referring once more to the lower end of the inclinometer, the sub 22 is provided at its upper end with a choke socket 53 including a cylindrical bore 50 of larger diameter than flow passage 51 therebelow forming an upwardly facing shoulder 52. The lower end of bore 50 is provided with an inwardly projecting thread 54. Received within the choke socket is replaceable choke sleeve 56 of hard wear resistant material. Sleeve 56 is threaded at 58 to engage socket thread 55 to retain the sleeve in the socket. The sleeve is castellated at its upper end as shown at 59 to facilitate insertion and removal. An O-ring seal 61 is disposed in annular groove 63 around sleeve 56 to seal between the choke socket and sleeve.

The inner diameter of sleeve 56 is smaller than the diameter of flow passage 51. Mounted for axial reciprocation in sleeve 56 is a flow restriction plug 60. When plug 60 is positioned in sleeve 56 as shown, fluid flow between the plug and sleeve is restricted to flow through the annulus 62 therebetween. A downward flow through the sleeve causes a pressure differential between the space 64 above the plug and that at 66 below the plug. This pressure differential exerts a force tending to move the plug down into flow passage 51 at 65 where there is more space 67 for fluid flow, as shown in dashed lines in FIG. 1C.

INSTRUMENT MOUNTING

Sleeve 56 is provided at its upper end with seat means 70 comprising a bore 72 of larger diameter than the inner diameter of sleeve 56 at 74, with an upwardly facing conical shoulder 76 therebetween. An annular groove 78 in bore 72 receives an O-ring seal 80. The upper inner edge of sleeve 56 is bevelled at 82 to provide guide means for facilitating entry engage socket thread 55 to retain the sleeve in the socket. The sleeve is castellated at its upper end as shown at 59 to facilitate insertion and removal. An O-ring seal 61 is disposed in annular groove 63 around sleeve 56 to seal between the choke socket and sleeve.

The inner diameter of sleeve 56 is smaller than the diameter of flow passage 51. Mounted for axial reciprocation in sleeve 56 is a flow restriction plug 60. When plug 60 is positioned in sleeve 56 as shown, fluid flow between the plug and sleeve is restricted to flow through the annulus 62 therebetween. A downward flow through the sleeve causes a pressure differential between the space 64 above the plug and that at 66 below the plug. This pressure differential exerts a force tending to move the plug down into flow passage 51 at 65 where there is more space 67 for fluid flow, as shown in dashed lines in FIG. 1C.

INSTRUMENT MOUNTING

Sleeve 56 is provided at its upper end with seat means 70 comprising a bore 72 of larger diameter than the inner diameter of sleeve 56 at 74, with an upwardly facing conical shoulder 76 therebetween. An annular groove 78 in bore 72 receives an O-ring seal 80. The upper inner edge of sleeve 56 is bevelled at 82 to provide guide means for facilitating entry of the lower end 84 of the inclinometer instrument 85.

Referring now to the upper end of the inclinometer, the flow passage through sub 41 includes an upper conically tapered downwardly conveying guide portion 90, a central cylindrical seat means portion 92, and a lower downwardly flaring conically tapered portion 94. Seat means 92 is adapted to receive and laterally support the upper end of inclinometer instrument 85.

It will be seen from the foregoing that the inclinometer instrument 85 is support at its ends in seat means 70 and 92 carried by the fluid conducting portion of the inclinometer, the fluid conducting portion or flow tube comprising pipe 20 and subs 22, 41. Seal means 80, at the lower seat means 70, seals with the lower end of the instrument.

The instrument 85 includes a tubular housing 100 into the upper and lower ends of which are screwed tubular spiders 102, 104.

The spiders 102, 104 are received by seats 92 and 70 providing means releasably mounting the instrument in the flow tube.

LOWER SPIDER

Spider 104 includes a tube 105 received in seat 70, a plurality of radial webs 107 azimuthally spaced apart leaving fluid passages therebetween, and a tubular hub 109. Spider 104 is sealed to the housing by O-ring 103 carried in annular groove 108 on pin 110 at the upper end of the hub 109, the pin engaging the threads 112 inside the lower end of the housing. The central bore 120 in the upper end of the hub 109 provides bearing means within which actuator stem 106 is reciprocatingly disposed. An O-ring seal 111 disposed in annular groove 113 in bore 120 provides a seal between stem 106 and bore 120.

The lower end of stem 106 extends into bore 122 in plug 60 and is screwed into split nut 124 disposed in groove 126 in plug 60. O-ring seal 127 disposed in groove 129 in plug 60 seals the plug 60 to stem 106. The plug is torpedo shaped to minimize turbulence and attendant wear on the plug and choke sleeve 56 due to the passage of the usually abrasive drilling fluid.

SPRING BIAS

Stem 106 extends through spider bore 120 into the lower part of instrument housing 100. Also disposed in the lower part of housing 100 is a helical compression spring 130 bearing at its lower end against the upper end of spider hub 109. The spring coaxially encompasses the stem 106.

DASHPOT

At its upper end the stem 106 is screwed into a generally cylindrical dashpot piston 132. The upper end of spring 130 bears against the lower end of piston 132. Piston 130 reciprocates in tube 138 which forms the lower part of housing 100. Tube 138 is filled with light oil to restrain movement of piston 132 axially within the tube. The fit between the outer periphery of the piston and the inner periphery of the tube may provide sufficient clearance to allow fluid passage therepast. Preferably, however, an O-ring is disposed in annular groove 136 around the piston 132, providing means to seal between the piston and tube 138, and there are ports 131, 135 extending through the piston 132 from the lower end to the upper end thereof providing passage for the flow of fluid past the piston. A check valve 133 disposed in the upper end of port 131 and a control valve 137 disposed in the upper end of port 135 provide an adjustable predetermined directionally asymmetrical restriction of the flow past the dashpot piston 132.

The control valve 137 restricts the flow equally from both the upper end of the piston 132 and from the lower end of the piston 132 in accordance with its position of adjustment. The check valve 133 prevents flow through port 131 that enters from the upper end of the piston 132 but permits fairly free flow through port 131 that enters from the lower end. The flow passage means comprising ports 131, 135 and valves 133, 137 permits the dashpot piston 132 to make faster descent than ascent within the instrument 85. The dashpot presents a relatively low resistance to downward motion, such as occurs when the pumps are turned on and drilling fluid flows down through the drill pipe, but provides a greater resistance to upward motion so that the instrument will not be moved to the recording position by short duration pressure drops, but only by such extended pressure drops as occur when a length of pipe is added to the drill string or it is specifically desired to record the well inclination and the pumps are shut down. Valves 133, 137 also provide a means for predetermining the rate of movement of the dashpot piston 132 within the tube 138 and thus provide a means for adjustable delay action.

Piston 132 is provided with a tongue 140 extending upwardly therefrom into a tape cartridge 142. Tongue 140 is pivotally connected to the generally cylindrical tape cartridge 142 by a pin 144 passing through apertures in the cartridge and tongue and retained in position by split ring 146.

Cartridge 142 is adapted to reciprocate within housing tube 138 whenever the fluid flow through the fluid conducting portion of the inclinometer is shut off and resumed. A flat portion 148 (FIG. 2) on the cartridge cooperates with a flat inner surface 150 on a key 152 fastened to tube 138 to prevent the cartridge from rotating within housing tube 138.

Key 152 also includes a cam shoulder 154. Whenever there is fluid flow through the flow tube of the inclinometer sufficient to force plug 60 and actuator stem 106 downwardly against the resistance of spring 130 and the flow is maintained long enough to overrun the resistance of dashpot piston 132, cartridge 142 is moved downwardly to the extent that escapement pawl 156 is engaged and moved by cam shoulder 154. At this point further travel is prevented by stop collar 158, fastened to actuator stem 106, engaging the stop means provided by the upper end 160 of spider hub 109.

When fluid flow through the flow tube is cut down sufficiently, e.g. cut off, the plug 60 and actuator stem move upwardly under the force of spring 130. If the flow reduction is maintained long enough to overcome the resistance of dashpot piston 132, cartridge 142 is moved upwardly to the extent that escapement pawl 156 moves past shoulder 154 to the upper thinner part 162 of the key 152 which allows the pawl to turn back to its previous position under the action of the escapement and connected mechanisms that will be described hereinafter.

Upon resumption of flow, of sufficient magnitude and time duration, the cartridge 142 again moves down and escapement pawl 156 again rides up over cam shoulder 154. Thus, each time the pumps are shut off and turned on again, as when a joint of pipe is added to the drill string, the escapement pawl is actuated one cycle. This causes recording tape 164 to move one frame over platen 166 provided at the upper end of the cartridge.

PENDULUM

Lower tube 138 of instrument housing 100 is connected by double pin tubular connector 168 to an upper tube 170 forming an upper part of housing 100. Connector 168 is provided with a threaded lower pin 172 engaging threaded socket 174 in the upper end of tube 138 and sealed thereto by O-ring seal means 176 disposed in annular groove 178 at the base of the pin 172. Connector 168 is further provided with a threaded upper pin 182 engaging threaded socket 184 in the lower end of tube 170 and sealed thereto by O-ring seal means 186 disposed in annular groove 188 at the base of pin 182.

Pin 182 is provided at its upper end with a bearing block 190 integral therewith. Block 190 has an upwardly facing hemi-spherical surface 192. A bearing cap 194 is fastened to block 190 by a plurality of screws, not shown. Cap 194 has a downwardly facing hemi-spherical surface 196. Aligned ports 198, 200 provide passage means for flow of fluid, e.g. oil, between connector 168 and upper tube 170.

Upper ball bearing means 202 is disposed in cap 194. Lower ball bearing means 204 is disposed in block 190. The upper ball bearing means includes inner and outer races 206, 208 between which are disposed spheres 210. The lower ball bearing means includes inner and outer races 212, 214 between which are disposed spheres 216.

Disposed between spheres 210 and 216 is a ball 220. Ball 220 supports a pendulum 222 including a stem 224 connected to ball 220 and a bob 226 connected to stem 224. Stem 224 extends through aperture 228 in the bearing block 190. Block 190, cap 194, ball bearing means 202, 204, and ball 220 form an antifriction universal joint of the ball and socket type. The universal joint supports the pendulum for turning in any direction except as limited by the sides of the bob 226 contacting the inner periphery of pin 172.

MARKING MEANS

Bob 226 has a marking means 300 adapted to make a mark on tape 164. Preferably marking means 300 is a punch, and platen 166 is made of soft resilient means such as rubber so that the punch can pass through tape 164.

It may be desirable for pendulum 222 or ball 220 or both to be permanently magnetized as a dipole, or carry permanent dipole magnets, with the axis of magnetization lying in a plane perpendicular to the pendulum axis, so that the dipole axis lines up with the earth's magnetic field, the surrounding parts of the inclinometer being made of non-magnetic material such as monel. The marking means is in the form of an arrow or V so that when the recording tape is punched, the resulting mark indicates not only angle of inclination but also direction of inclination.

In order to provide reference means on the tape whereby the extent of magnitude of the inclination can be readily determined, lines 309 are printed on each frame of the tape defining, e.g. a square frame or a field with sides parallel and perpendicular to the sides of the tape. The escapement mechanism, hereinafter described, controlled by pawl 156, causes the tape 164 to advance one frame on each up and down cycle of the cartridge and corresponding cycle of the escapement. At each cycle, a new frame is marked and the inclination of the well bore as indicated by the pendulum is recorded as to both magnitude and direction.

UPPER SPIDER

The upper end of the tube 170 is provided with a threaded socket 308 receiving and engaging threaded pin 310 provided on the lower end of hub 312 forming part of spider 102. From hub 312 extend azimuthally spaced webs 314 providing fluid flow passages therebetween. The webs 314 connect at their upper ends with tube 316 which is supported by seat 92. A conventional fishing neck 321 as provided on the upper end of the tube 316 to permit the well tool to be retrieved by a fishing tool after recordings are made.

PRESSURE BALANCING MEANS

A piston 318 is slidably disposed within tube 170 and sealed thereto by O-ring seal means 320 disposed in annular groove 322 on the piston. A plurality of ports 324 through tube 170 admit drill string fluid into tube 170. The resulting fluid pressure acts downwardly on piston 318 and the pressure of the fluid in tube 170, e.g. oil, below piston 318 acts upwardly thereon, the piston moving up or down until these forces are in balance. This prevents the instrument housing from collapsing or exploding under variations in pressure in the drill string. In this regard it may be noted that at the bottom of the drill string near the bit, there may be a hydrostatic head of several thousand feet of drilling mud, to which may be added the pump pressure whenever the mud pumps are actuated, less whatever pressure drop exists in the fluid path between the pumps and the instrument. Therefore, there may be a considerable variation in drill string pressure at the instrument level.

Referring now to FIGS. 3 through 10, there is shown the detail of the tape cartridge 142. The cartridge includes two modified hemicylindrical bodies 331, 333 releasably fastened together by screws 335 (see FIGS. 1 and 3) extending into threaded holes 337 in body 331 through holes 339 in body 333, the heads of the screws being received in counterbores 341. Additional holes 343 in body 333 are adapted to receive guide pins 345 to insure accurate alignment of bodies 331, 333 when assembled.

The bodies 331, 333, are provided with correlative recesses 347 adapted to receive tongue 140 (see FIG. 1) and allow angular displacement of cartridge 142 relative to dashpot piston 132. Coaxial holes 349 in the bodies 331, 333 form a bearing to receive pin 144 that pivotally connects tongue 140 to cartridge 142.

A plurality of pairs of correlative recesses 351, 353, 355 are adapted to receive respectively a tape supply reel 357 with friction brake, as detailed in FIG. 10, a tape takeup reel 359 with spring drive, as detailed in FIG. 9, and a measuring reel 361 with escapement, as detailed in FIGS. 8, 11 and 12.

Pairs of correlative recesses 363, 365 are adapted to receive idler guide rollers 367, 369. Pairs of coaxial holes 371, 373 provide support for pairs of ball bearings 375, 377, held in place in the holes by pairs of snap rings 379, 381. Shafts 383, 385, on which rollers 367, 369 are mounted, are rotatably carried by the bearings 375, 377.

At the upper ends of cartridge bodies 331, 333 are correlative recesses 378, 380 forming a cavity in which is disposed rubber platen 166. Four cap screws 382 and washers 384 retain the platen in the cavity, securing it to the cartridge bodies.

Figure 2:
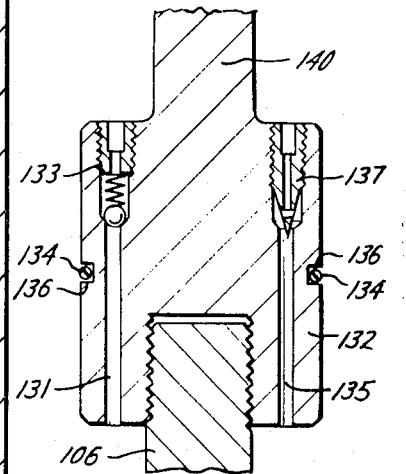
FIG. 2 is an axial section through the dashpot piston at the plane indicated in FIG. 1B.

As shown in FIG. 2, tape 164 unreels from supply reel 357, passes over guide roller 367 and travels up along the coplanar flats 390, 392 at the side of the cartridge bodies, then turns and passes over rubber platen 166 and turns back, goes over measuring reel 361, doubles back over roller 369, and winds up on take-up reel 359.

SUPPLY REEL AND BRAKE

Referring now to FIG. 10, the supply reel 357 includes a sleeve 401 which is fixedly mounted on a shaft 403. Shaft 403 extends into aligned holes 405, 407 in cartridge bodies 333, 331, and is held against axial motion by snap rings 409, 411. A thrust washer 409 is disposed between the end of sleeve 401 and the adjacent wall of recess 351 in the body 333. A thrust washer 410 is disposed between the other end of sleeve 401 and thrust collar 413. A helical compression spring 415 bears at one end against flange 417 on the thrust collar and at its other end against the adjacent side of recess 351 in cartridge body 333. The spring produces sufficient axial loading on the thrust collar, thrust washers, and sleeve 401 to create a frictional drag or braking action resisting rotation of reel 357.

Sleeve 401 of reel 357 is preferably press fitted onto shaft 403. Shaft 403 is slotted at 419 whereby a key blade can be inserted to turn shaft 403 and with it reel 357. By this means a tape 164 can be rewound on reel 357 whenever desired.

Means, not shown, such as a spring clip, is preferably provided for enabling one end of the tape to be secured to drum 418 forming the outer periphery of reel 357. Alternatively, the tape, e.g. a brass strip of a few thousandths of an inch thickness, may be fastened to drum 418 with pressure sensitive adhesive tape.

TAKE-UP REEL AND SPRING

Referring now to FIG. 9, the take-up reel 359 includes a drum 421 carried by bearing sleeves 423, 424. Sleeve 423 has a flange 426 integral with drum 421 and sleeve 424 has a flange 428 telescopically fitting into the end of drum 421. Sleeves 423 and 424 are rotatably mounted on shaft 425. The ends of shaft 425 are disposed in coaxial holes 427, 429 in the cartridge bodies 333, 331. Counterbores 431, 433 receive the outer ends of sleeves 423, 424 positioning the drum centrally in recess 353. Shaft 425 is provided with thrust collars 435, 437 which lie adjacent the inner ends of sleeves 423, 424. The shaft 425 is thereby retained against axial displacement out of holes 427, 429.

A coiled flat spring 439 is wound around shaft 425 and has one end tucked into slot 441 in the shaft or is otherwise fastened thereto. The other end of spring 439 is secured to drum 421, e.g. by soldering thereto. Normally a set screw 443 screwed into threaded hole 445 bears against shaft 425 to prevent rotation thereof. However when it is desired to wind up the spring the set screw is loosened and the blade of a key or screwdriver is inserted into slot 447 and shaft 425 is turned. As the shaft turns the spring is wound up, it being understood of course that drum 421 is held against rotation during this time, e.g. by tape 164, one end of which is secured thereto, e.g. in the same manner as the other end is secured to the drum 419 of reel 357. The tape will be held against movement during such time by the measuring reel and escapement next to be described.

MEASURING REEL AND ESCAPEMENT

Referring to FIGS. 8, 11 and 12, and particularly to FIG. 8, the measuring reel 361 includes an outer cylindrical drum 451 which has sprocket teeth 453 at its ends uniformly spaced apart about the periphery thereof which engage correlative holes 445 (see FIG. 3) in the tape 164. A central radial flange 457 connects the drum 451 to sleeve 459. The sleeve is fastened to shaft 462 by a key 463 engaging correlative slots in the sleeve and shaft. The same key also secures escapement wheel 465 to shaft 462 in like manner. Shaft 462 is rotatably mounted in ball bearings 467, 469 disposed at the ends of the shaft, the ball bearings being held by snap rings 471, 473 in counterbores 475, 477 to holes 479, 481 in cartridge bodies 333, 331.

The pawl 156, previously referred to, is pivotally mounted by its pivot pin 483 in bearing hole 485 in cartridge body 333. Pawl 156, as shown in FIG. 11, is rotated toward point 487. This is the direction toward which it is urged by the spring 439 of the take-up reel acting on tape 164 which in turn, acting through sprocket drum 451, tends to turn shaft 462 and escapement wheel 465 in the direction of the arrow (FIG. 11), the teeth 489, 490, 492, 494 of the escapement wheel acting on pin 491, of the pawl.

Whenever cartridge 142 moves down relative to key 152 to the position shown in FIG. 12, in the manner previously described, the cam surface 154 engages the tail 493 of pawl 156 and turns the pawl to the position shown in FIG. 12. This moves pin 491 out of engagement with escapement wheel tooth 489 and the escapement wheel turns approximately one-eighth of a revolution until wheel tooth 489 engages pawl pin 495. At this time the pawl is prevented from turning by engagement of pawl tail 493 with surface 150 of key 152.

Whenever cartridge 142 moves back up away from key 152 to the position shown in FIG. 11, in the manner previously described, pawl 156 turns back to the position shown in FIG. 11. This causes pawl pin 495 to move out of engagement with wheel tooth 489 and allows the wheel 465 to turn in the direction of the arrow until wheel tooth 490 engages pawl pin 491. The wheel has now turned one-quarter revolution and allowed the take-up drive to move the tape a corresponding distance. This action is repeated every time cartridge 142 moves down and up relative to key 152.

As the tape is moved step by step under the control of the measuring reel and escapement, as actuated by reciprocation of the cartridge 142, caused by changes in fluid pressure, or to be more precise, by changes in rate of fluid flow past plug 60, the marking means causes the position of the pendulum relative to the flow tube to be marked on the tape. Whenever desired, the cartridge can be removed from the flow tube and the tape read to determine the inclination of the well bore bottom at various times. A record of hole depth and time of day will be kept versus actuations of the inclinometer so that the record of the tape can be plotted against drilling progress.

Normally the cartridge will be removed and the tape replaced every time the drill string is removed from the well bore, as when changing bits, but it can also be removed (and the tape replaced) at any time by means of a wire line running and retrieving tool, the tool engaging with the fishing head 321 provided on upper spider tube 316. Suitable tools for such purpose are those shown and described on pages 3892–3894 of the "Composite Catalog of Oil Field Equipment and Services", 27th Revision (1966–67) published by World Oil, A Gulf Publishing Company Publication, Houston, Texas, can be used.

MATERIALS

As indicated by the drawings, the inclinometer is preferably made of metal, e.g. steel. If the tool is to include a magnetic pendulum to indicate direction then the other parts should all be made of non-magnetic material, such as monel, stainless steel, or brass.

Although the tape 164 has been described as being made of brass, other materials that have a low temperature coefficient of expansion and a resistance to deterioration under ambient conditions in a well bore could be used.

While a preferred embodiment of the invention has been shown and described, modifications thereof can be made by one skilled in the art without departing from the spirit of the invention.

We claim:

1. A well tool comprising:
   a flow tube for connection in a drill string to transmit drilling fluid,
   an instrument mounted in said flow tube, said instrument including indicator means responsive to a well characteristic for producing an indication measuring said characteristic,
   recording means to record the indications of said indicator means,
   flow responsive means responsive to a rate of fluid flow through said flow tube to actuate said recording means,
   said indicator means including an indicator movable in response to said well characteristic,
   said recording means including marking means carried by said indicator and a mark receiving means actuated by said flow responsive means to actuate said recording means to record the well characteristic,
   said mark receiving means including a cartridge reciprocable relative to said marking means and reciprocated by said flow responsive means, said mark receiving means being carried by said cartridge,
   said recording means including drive means to move said mark receiving means relative to said cartridge,
   said drive means being actuated by said flow responsive means to move said drive means step by step in response to variations of the rate of flow exceeding a predetermined amount,
   said mark receiving means comprising a tape having sprocket apertures therealong, said drive means comprising a rotatably mounted supply reel, a rotatably mounted take-up reel, and a rotatably mounted measuring sprocket reel, spring means tending to rotate said take-up reel in one direction, friction brake means resisting rotation of said supply reel, and escapement means limiting rotation of said measuring reel, said tape extending from said supply reel over said measuring reel to said take-up reel, said flow responsive means controlling said escapement means to effect movement of said drive means step by step as aforesaid.

2. A well tool according to claim 1, said cartridge carrying said reels, brake, and escapement, and cam means carried by said flow tube to actuate said escapement upon each reciprocation of said cartridge, thereby to effect said step-by-step movement of said tape.

3. A well tool according to claim 2, said instrument including a housing within which are disposed said indicator means and recording means, said cam means being mounted on the interior of said housing, said escapement including a pawl in position to engage said cam means upon reciprocation of said cartridge to actuate said escapement means.

4. A well tool for recording well characteristics in a pipe string comprising:
   a tubular housing;
   tape mounted on said housing for receiving a mark indicating said well characteristic;
   drive means on said housing for moving said tape relative to said housing; and
   responsive means actuable from a remote location for actuating said drive means; and
   escapement means limiting said drive means in moving said tape, said responsive means controlling said escapement means to effect a movement of said drive means by a step-by-step motion imparted to said tape.

5. A well tool according to claim 4 wherein said drive means includes supply means for supplying said tape and take-up means for taking up said tape.

6. A well tool according to claim 4 and including means on said housing adapting it for retrieval from said pipe string and for moving it upwardly to the upper end of the said pipe string.

7. A well tool according to claim 4 wherein said responsive means is responsive to a change in the rate of flow of fluid through said pipe string.

8. A well tool for recording well characteristics in a well pipe string comprising:
- a flow tube adapted to be connected in said well pipe string,
- an instrument retrievably mounted in said flow tube,
- a recording tape in said instrument,
- supply and take-up means for said tape,
- means for driving said tape from said supply means to said take-up means in response to a predetermined change in the rate of fluid flow through said flow tube,
- escapement means engaged with said drive means to limit said drive means to step-by-step advancement of said tape upon successive changes in said rate of fluid flow,
- an indicator in said instrument responsive to a well characteristic,
- means on said indicator adapted to record said characteristic on said tape in response to each advancement of said tape.

9. A well tool as defined by claim 8 and including tape marking means on said indicator, and
- means for moving said tape and said tape marking means into contact with each other in response to each said change in rate of fluid flow.

10. A well tool as defined by claim 9 and including means on said instrument adapting it for retrieval from said pipe string and for moving it upwardly to the upper end of the pipe string.

11. A well tool according to claim 8, said tape including a plurality of frames, each frame having a field defined thereon.

12. A well tool according to claim 9, said indicator including a pendulum; said pendulum incorporating magnetic dipole means, the portions of the well tool surrounding said pendulum being made of nonmagnetic material, and said marking means having a point indicating direction.

* * * * *